United States Patent
Veninger et al.

(10) Patent No.: US 10,473,117 B2
(45) Date of Patent: Nov. 12, 2019

(54) DIFFUSER CASE FOR A GAS POWERED TURBINE

(71) Applicant: United Technologies Corporation, Hartford, CT (US)

(72) Inventors: Albert Veninger, Coventry, CT (US); Conway Chuong, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 985 days.

(21) Appl. No.: 14/805,536

(22) Filed: Jul. 22, 2015

(65) Prior Publication Data
US 2017/0023015 A1    Jan. 26, 2017

(51) Int. Cl.
   *F02C 3/14*    (2006.01)
   *F04D 29/54*   (2006.01)
   *F01D 25/28*   (2006.01)
   *F23R 3/26*    (2006.01)

(52) U.S. Cl.
   CPC ......... *F04D 29/547* (2013.01); *F01D 25/285* (2013.01); *F23R 3/26* (2013.01)

(58) Field of Classification Search
   CPC . F01D 9/02; F01D 9/023; F01D 25/24; F01D 25/243; F01D 25/28; F01D 25/285; F02C 3/14; F23R 3/60
   See application file for complete search history.

(56) References Cited

U.S. PATENT DOCUMENTS

| | | | |
|---|---|---|---|
| 3,327,473 A | 6/1967 | Smith | |
| 3,650,106 A | 3/1972 | Guillot | |
| 5,572,863 A | 11/1996 | Wrightham et al. | |
| 8,118,251 B2 | 2/2012 | Suciu et al. | |
| 8,328,133 B2 | 12/2012 | Suciu et al. | |
| 2009/0236469 A1 | 9/2009 | Suciu et al. | |
| 2010/0101065 A1 | 4/2010 | Macchia et al. | |
| 2013/0081399 A1* | 4/2013 | Wiebe | F01D 9/023 60/752 |
| 2013/0219920 A1 | 8/2013 | Suciu et al. | |

FOREIGN PATENT DOCUMENTS

| | | |
|---|---|---|
| WO | 2008037554 | 4/2008 |
| WO | 2013052438 | 4/2013 |
| WO | 2015066473 | 5/2015 |

OTHER PUBLICATIONS

European Search Report for Application No. 16180901.7 dated Nov. 16, 2016.

* cited by examiner

*Primary Examiner* — Arun Goyal
(74) *Attorney, Agent, or Firm* — Carlson, Gaskey & Olds, P.C.

(57) ABSTRACT

A turbine engine includes a diffuser connecting a compressor section and a turbine section. The diffuser includes a diffuser frame and multiple diffuser case sections are connected to the diffuser frame.

16 Claims, 6 Drawing Sheets

DIFFUSER CASE FOR A GAS POWERED TURBINE

TECHNICAL FIELD

The present disclosure relates generally to gas powered turbines and more specifically to a diffuser case for the same.

BACKGROUND

Gas powered turbines, such as those utilized in industrial land based applications, utilize a compressor to compress a gas, a combustor to mix the compressed gas with a fuel and ignite the mixture, and a turbine across which the resultant combustion gasses are expanded. Expansion of the combustion gasses across the turbine section drives the turbine section to rotate. The rotation is translated to a shaft which outputs rotational motion from the gas powered turbine. The output shaft is, in some examples, connected to an electrical generator that converts the rotational motion into electrical energy.

Each of the sections includes internal components that require maintenance over the life span of the gas powered turbine. In order to access the internal components, the entire section being serviced is removed from the gas powered turbine and disassembled. The repaired or replaced component is then reinstalled, and the gas powered turbine is reassembled.

SUMMARY OF THE INVENTION

In one exemplary embodiment a turbine engine includes a diffuser connecting a compressor section and a turbine section, and the diffuser includes a diffuser frame and a plurality of diffuser case sections connected to the diffuser frame.

In another exemplary embodiment of the above described turbine engine the diffuser frame includes a first ring, a second ring, and a plurality of structural ribs connecting the first ring and the second ring.

In another exemplary embodiment of any of the above described turbine engines, one of the first ring and the second ring is connected to a compressor section and the other of the first ring and the second ring is connected to a turbine section.

In another exemplary embodiment of any of the above described turbine engines, each of the ribs includes at least one fastening feature configured to interface with one of the diffuser case sections.

In another exemplary embodiment of any of the above described turbine engines, the first ring includes a flanged portion radially thinner than a remainder of the first ring and the second ring includes a flanged portion radially thinner than a remainder of the second ring.

In another exemplary embodiment of any of the above described turbine engines, each of the ribs includes at least one flange portion, and wherein the at least one flange portion is radially thinner than a remainder of the corresponding rib.

In another exemplary embodiment of any of the above described turbine engines, each of the ribs bows radially outward relative to a centerline of the turbine engine.

In another exemplary embodiment of any of the above described turbine engines, each of the ribs further comprises a gusset extending radially inward from the rib at the bow.

In another exemplary embodiment of any of the above described turbine engines, the diffuser frame further comprises at least one structural mount structurally connecting the diffuser frame to an engine support.

Another exemplary embodiment of any of the above described turbine engines further includes at least one combustor case extending radially outward from at least one of the diffuser case sections.

Another exemplary embodiment of any of the above described turbine engines further includes an external combustor disposed at least partially within the combustor case.

In another exemplary embodiment of any of the above described turbine engines, the external combustor is disposed partially within the combustor case and partially within a corresponding diffuser case section.

In another exemplary embodiment of any of the above described turbine engines, the diffuser comprises an internal cavity defined by the frame and the plurality of diffuser case sections.

In another exemplary embodiment of any of the above described turbine engines, at least one of the diffuser case sections includes an unbroken contour at an exterior surface.

In another exemplary embodiment of any of the above described turbine engines, the diffuser frame is a structural support configured to at least partially support the turbine engine while at least one diffuser case section is removed.

In another exemplary embodiment of any of the above described turbine engines, the diffuser frame is a structural support configured to provide full structural support to a combustor portion of the turbine engine while at least one diffuser case section is removed.

An exemplary method for maintaining a turbine engine includes removing a diffuser case section while the turbine engine is in situ, accessing a component, servicing the component, and replacing the diffuser case section.

Another example of the above described exemplary method further includes providing structural support to the turbine engine using a diffuser case frame.

In one exemplary embodiment a land based turbine engine includes a compressor section, a combustor section fluidly connected to the compressor section, a turbine section fluidly connected to the combustor section, and a diffuser disposed in the combustor section, the diffuser including a structural diffuser frame configured to structurally support the combustor section.

In another example of the above described land based turbine engine, the diffuser further including a plurality of diffuser case sections connected to the diffuser frame.

These and other features of the present invention can be best understood from the following specification and drawings, the following of which is a brief description.

DETAILED DESCRIPTION OF AN EMBODIMENT

Figure 1:
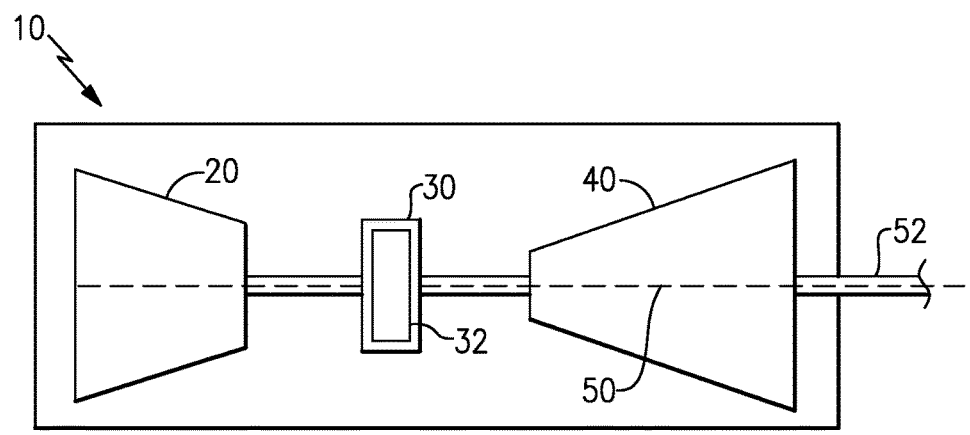
FIG. 1 schematically illustrates a gas powered turbine.

FIG. 1 schematically illustrates a land based gas powered turbine 10. The gas powered turbine 10 includes a compressor section 20, a combustor section 30, and a turbine section 40. The combustor section 30 includes a diffuser 32. A rotational shaft 50 is connected to the turbine section 40. During operation, gasses within the combustor section 30 are combined with a fuel and ignited. The resultant combustion gasses are passed through the diffuser 32 and provided to the turbine section 40. As the combustion gasses expand across the turbine section 40, the turbine section 40 is driven to rotate, which in turn rotates the shaft 50. The shaft 50 extends to the compressor section 20 and drives the compressor section 20 to rotate as well. An output shaft 52 is mechanically interfaced with the shaft 50 of the gas powered turbine 10, and provides a rotational output from the gas powered turbine 10 to an external system.

Over the lifespan of the gas powered turbine 10 components within the gas powered turbine 10 wear out and need to be replaced and/or repaired. In existing gas powered turbines, in order to repair or replace the diffuser 32, or a component contained within a diffuser, the entire combustor section 30 must be removed from the gas powered turbine. Removal of the combustor section 30 requires disassembly of a majority of the gas powered turbine 10.

Figure 2:
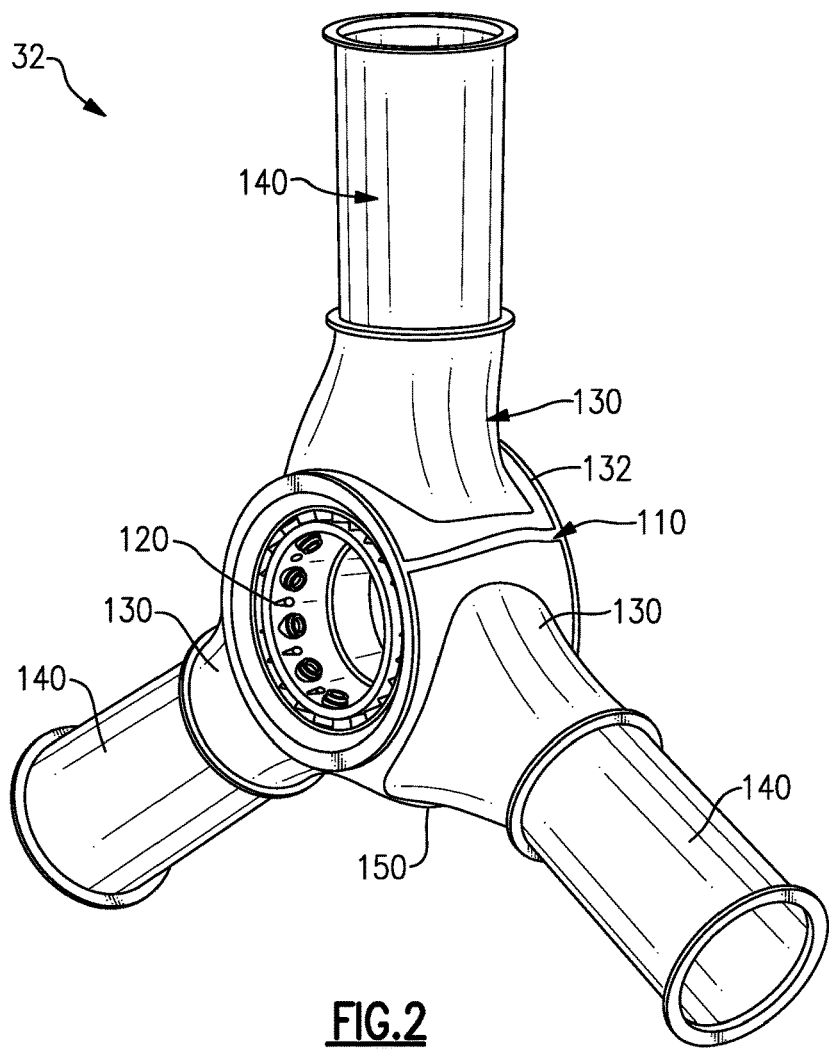
FIG. 2 schematically illustrates an exemplary diffuser assembly for the gas powered turbine of FIG. 1.

With continued reference to FIG. 1, FIG. 2 schematically illustrates an isometric view of an exemplary diffuser 32 for utilization in a combustor section 30 of a gas powered turbine 10. The exemplary diffuser 32 includes a diffuser frame 110 containing an inner diffuser case 120. Connected to the diffuser frame 110 are multiple diffuser case sections 130. In some examples, such as the illustrated example, the gas powered turbine 10 utilizes an external combustor. In such an example, combustor cases 140 are mounted to corresponding diffuser case sections 130. The external combustor is contained partially within the combustor case 140, and partially within the diffuser case defined by the combination of each of the diffuser case sections 130 and the diffuser case diffuser frame 110. In an installed configuration, the diffuser frame 110 is structurally connected to the compressor section 20 and the turbine section 40, and provides structural support to the diffuser 32 within the combustor section 30. In some examples, the diffuser frame 110 includes a support rail 150. The support rail 150 structurally connects the diffuser frame 110 to a housing or casing of the gas powered turbine 10.

Each of the case sections 130 is connected to the diffuser frame 110 via multiple fastener features 132. By way of example, the fastener features 132 can be through holes operable to receive a bolt, or other fastener type, and maintain the relative positions of the diffuser frame 110 and the corresponding case section 130.

The example diffuser 32 of FIG. 2 utilizes three diffuser case sections 130. In alternate examples, any other number of diffuser case sections 130 can be utilized depending on the structural requirements of the gas powered turbine, and the loads supported by the diffuser frame 110.

Figure 3:
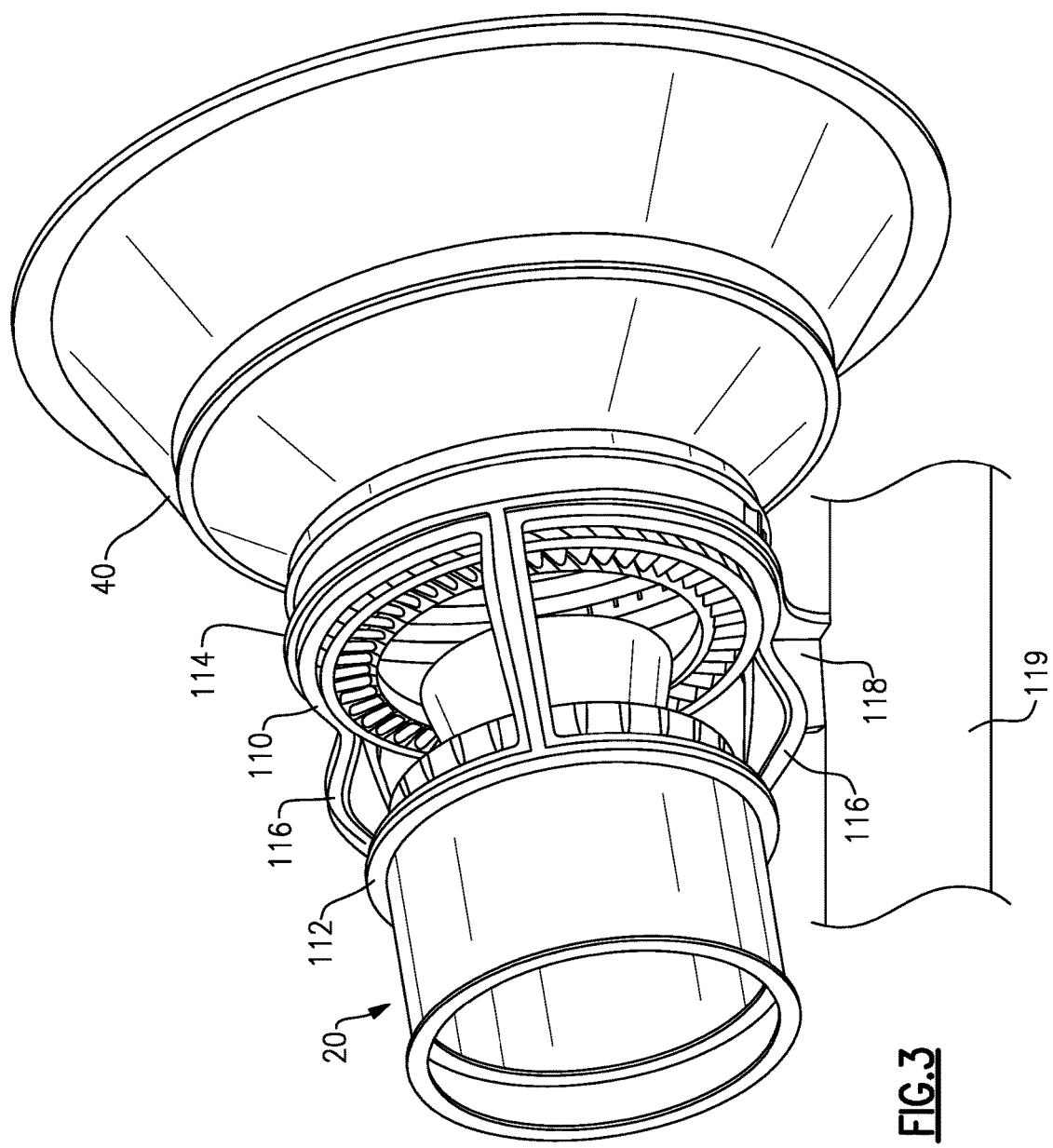
FIG. 3 schematically illustrates a partial installation of the exemplary diffuser assembly of FIG. 2.

With continued reference to FIGS. 1 and 2, FIG. 3 illustrates a diffuser frame 110 connecting a compressor section 20 of a gas powered turbine 10 to a turbine section 40 of the gas powered turbine 10. The diffuser frame 110 includes a forward ring 112 connected to an outlet of the compressor section 20. Similarly, an aft ring portion 114 of the diffuser frame 110 is connected to an inlet of a turbine section 40. Each of the rings 112, 114 is connected to the corresponding section 20, 40 of the gas powered turbine 10 via multiple fastener features. In alternative examples, the ring portions 112, 114 can be connected to alternate elements or features of the compressor section 20 and the turbine section 40 and provide similar structural support.

Multiple diffuser frame ribs 116 extend axially between the first ring 112 and the second ring 114. The diffuser frame ribs 116 provide structural support to the rings 112, 114, the diffuser 32, and to the adjacent compressor section 20 and turbine section 40 while some or all of the diffuser case sections 130 (illustrated in FIG. 2) are removed. In this way, the internal portions of the diffuser 32 can be accessed in situ, without removing the diffuser 32 from the gas powered turbine 10. By way of example, when an internal diffuser or combustor component requires servicing, a single diffuser case section 130 covering the component can be removed and the component can be accessed. While the case section 130 is removed, the diffuser frame 110 provides full structural support to the gas powered turbine 10. In some examples, the diffuser frame 110 also provides full structural support while all the diffuser case sections 130 are in an installed position.

Further incorporated into the diffuser frame 110 is a structural mount 118. In one example, the structural mount 118 is a rail aligned with one of the ribs 116. The structural mount 118 connects the diffuser frame 110 to a housing, or case, in the example of a land based turbine. In alternative examples, additional structural mounts 118 can be included and connect the gas powered turbine 10 to the housing, case or other engine support 119 containing and supporting the gas powered turbine 10. By way of example, if the gas powered turbine 10 is included within a geared turbofan engine or any other type of aircraft engine, the structural mount 118 can be connected to a case cowling, a pylon, or any other mounting structure.

With continued reference to FIGS. 1-3, FIG. 4 schematically illustrates an exemplary diffuser frame 110 isolated from the gas powered turbine 10. As described above, the diffuser frame 110 includes a first ring 112 and a second ring 114 connected by multiple ribs 116. An axis A is defined by each of the rings 112, 114. The ribs 116 are generally axially aligned. Each of the rings 112, 114 includes a flanged portion 210 that is radially thinner than a remainder of the ring 112, 114 relative to a centerline of the gas powered turbine 10. The flanged portion 210 includes multiple fastener features 212 that are configured to interface with a fastener and be sealed to a corresponding adjacent portion of the gas powered turbine via the interfaced fasteners. In one example, the fastener features 212 are through holes configured to interface with bolts, screws, or any similar fastener type.

Figure 4:
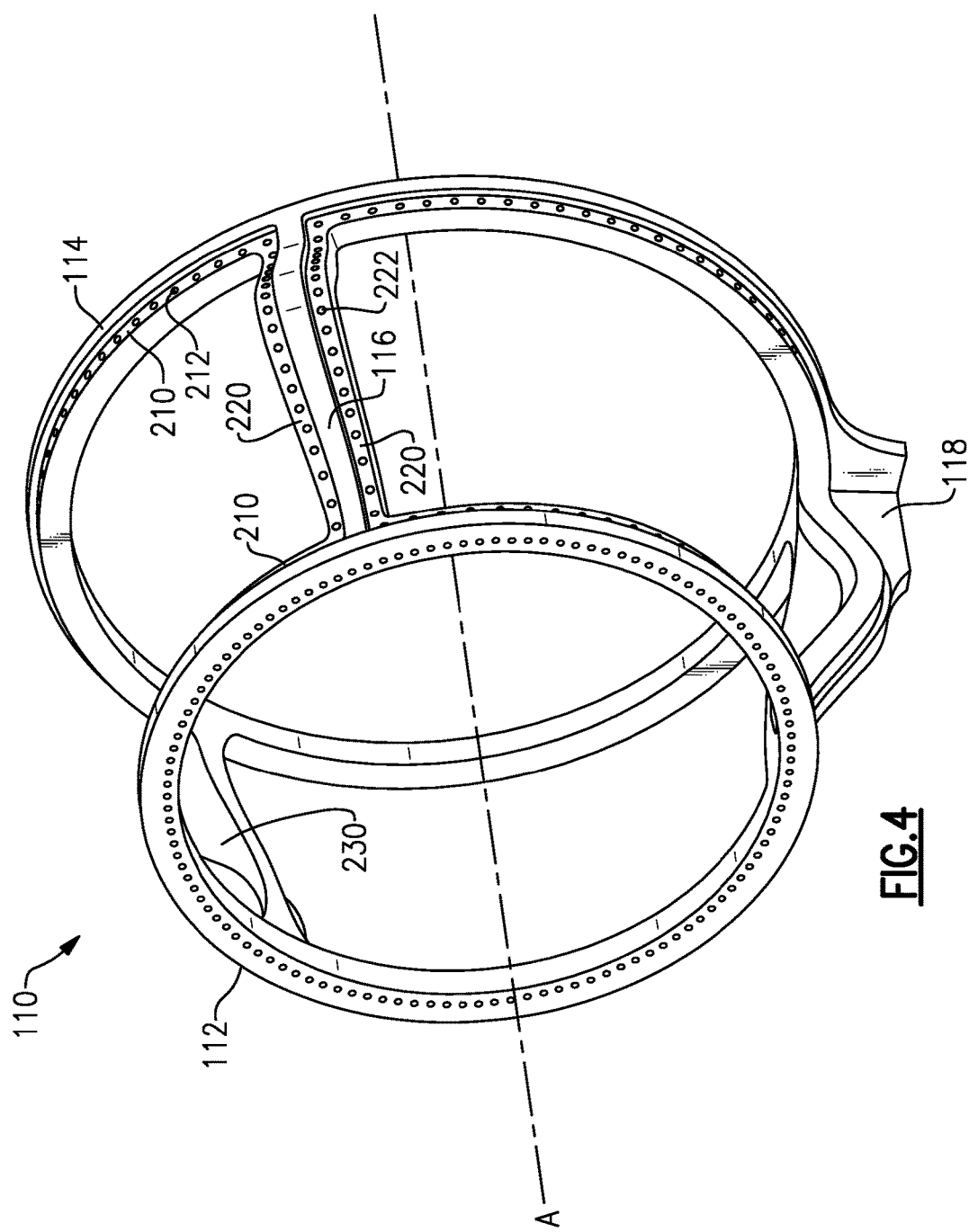
FIG. 4 schematically illustrates an isometric view of an example diffuser frame.
Figure 5:
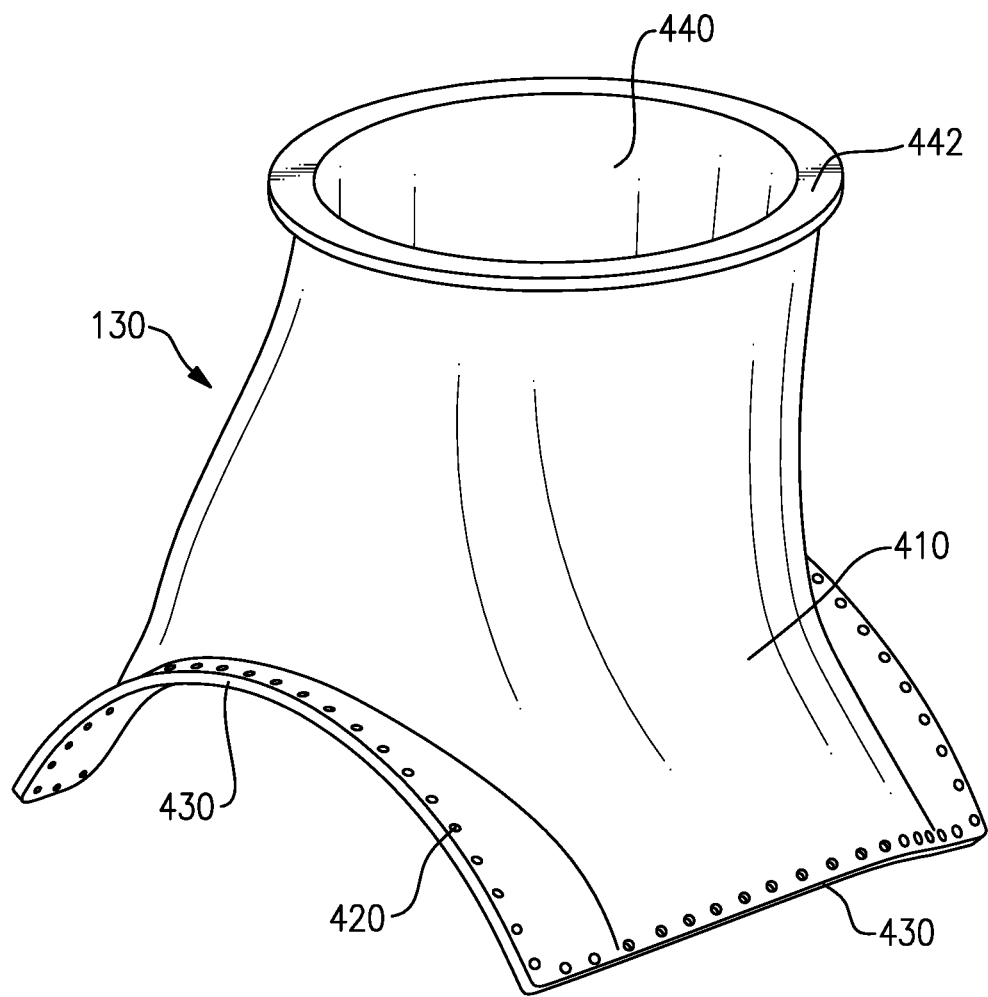
FIG. 5 schematically illustrates an exemplary diffuser case section.

Similarly, each of the ribs 116 includes two flanged portions 220. Each flanged portion 220 includes multiple fastener features 222. The fastener features 222 on the flanged portions 220 of the ribs 116 are similar in design and structure to the fastener features 212 of each of the rings 112, 114. The ribs 116 are bowed radially outward relative to the centerline of the gas powered turbine 10. In some examples the ribs 116 include a gusset 230 extending along the bowed portion. The gusset 230 increases the stiffness of the ribs 116, and provides additional structural support for the diffuser frame 110 and the gas powered turbine 10. In other examples, the ribs 116 are straight and do not include a gusset 230. Also included in the diffuser frame 110 is a structural mount 118. In the example of FIG. 4, the structural mount 118 takes the form of a rail provided axially along one of the ribs 116.

Depending on the design of the particular gas powered turbine 10, the structural mount 118 can be connected to one or both of the rings 112, 114 independent of the ribs 116 and provide similar structural support. In a further example, additional structural mounts 118 can be included at one or more additional ribs 116, or at locations on the rings 112, 114 independent of the ribs 116 and provide additional structural support.

With continued reference to FIGS. 1-4, FIG. 5 illustrates an example diffuser case section 130 for utilization in the diffuser 32 of FIG. 2. The case section 130 includes a contoured surface 410 that partially defines an internal cavity of the diffuser 32, when the diffuser case section 130 is installed. The internal cavity of the diffuser is fully defined by the combination of each of the case sections 130 and the diffuser frame 110. The diffuser case section 130 includes fastener features 420 along diffuser edges 430. In an installed configuration, the diffuser edges 430 nest in a corresponding flanged portion 220 of the diffuser frame 110, and the fastener features 420 interface with a fastener and a corresponding fastener feature 212, 222 of the diffuser frame 110. In some examples the exterior contoured surface 410 of the diffuser case section 130 is flush with the corresponding ribs 116, and rings 112, 114 when in an installed position. In alternative examples, the diffuser case section 130 is fastened to a radially outermost surface of the ribs 116 and rings 112, 114 and is not flush.

Figure 6:
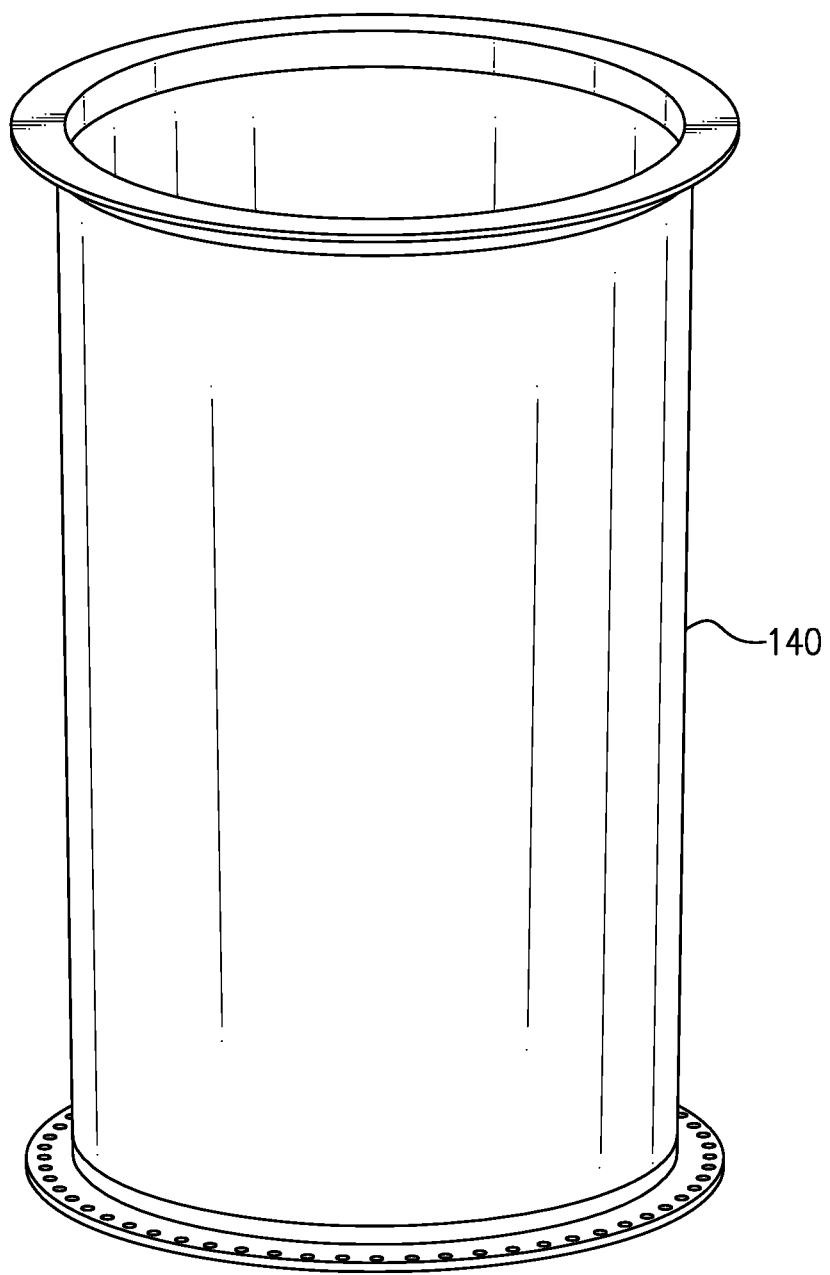
FIG. 6 schematically illustrates an exemplary combustor case.
Figure 7:
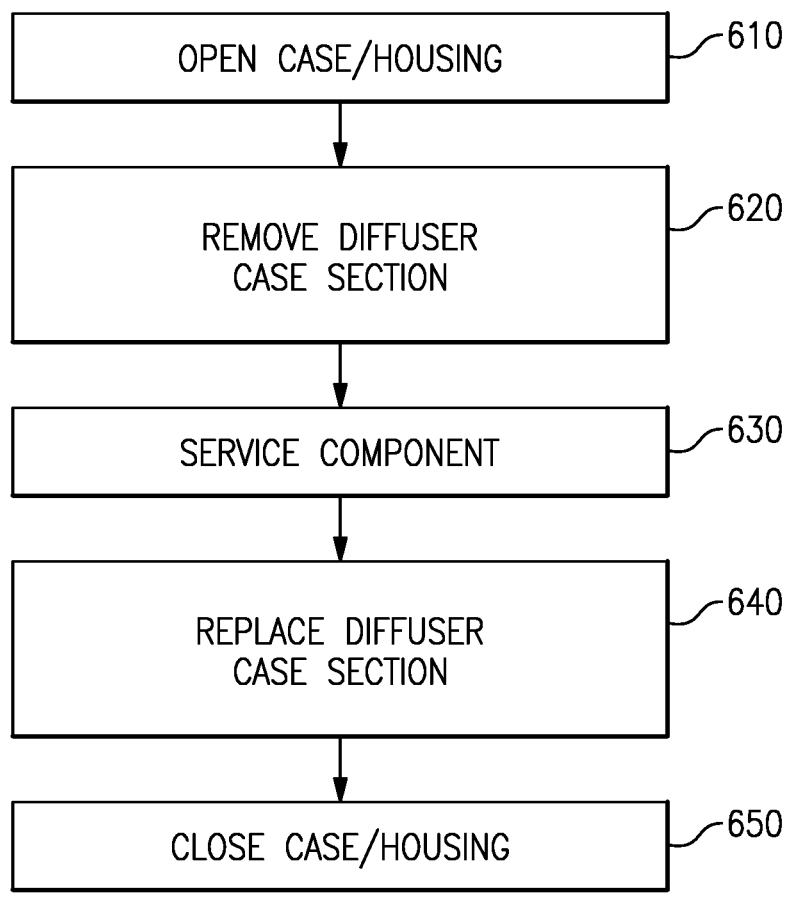
FIG. 7 illustrates a flowchart demonstrating a maintenance method for a gas powered turbine incorporating the diffuser assembly of FIG. 2.

The illustrated exemplary diffuser case section 130 includes a combustor opening 440 having a flange 442 for connecting to a corresponding combustor case (illustrated in FIG. 6). An external combustor is housed partially within the combustor case and extends into the internal cavity of the diffuser 32 through the combustor opening 440. The external combustor is then interfaced with the turbine section 40 according to existing external combustor interfacing techniques, and combustion gasses are provided from the combustor to the turbine section 40.

In alternative examples utilizing an internal combustor rather than an external combustor, the combustor opening 440 and corresponding flange 442 are omitted, and the contoured surface 410 of the diffuser case section 130 is an unbroken contour. The specific contour of the diffuser case section 130 is selected to define sufficient internal space within the diffuser for the diffuser components.

With continued reference to FIGS. 1-5, FIG. 6 illustrates a more detailed view of an exemplary combustor case 140 for utilization with an external combustor. The exemplary combustor case 140 is cylindrical and extends radially outward from a corresponding diffuser case and houses a portion of the external combustor.

Utilization of the diffuser 32 assembly described above allows the removal of outer diffuser case sections 130 that partially enclose either an annular combustor, multiple can type combustors, or an external combustor without requiring the full removal of the combustor section 30. The partial removal allows a worker to have access to, and to maintain, the components within the diffuser 32 and the combustor section 30 without requiring the worker to fully remove the diffuser and/or the combustor section 30. The structural diffuser frame 110 is a load carrying diffuser frame and facilitates the replacement of components within the combustor section.

The construction of the diffuser frame 110 allows combustion system hardware and flow path elements, such as transition ducts, to be installed and uninstalled within the diffuser case via the removal of a single corresponding diffuser case section 130. Such an action does not require taking the gas powered turbine apart or removing it from its installed state. In some examples, the utilization of the above described diffuser frame architecture allows for the removal and replacement of large arc sector transition ducts of greater than 60 degrees.

The flow path of the diffuser case is closed via the diffuser case sections that are fastened to the diffuser frame individually, thereby allowing the above described removal of a single diffuser section. In some examples, the diffuser sections are non-load bearing and the full structural load on the diffuser is born by the diffuser frame.

With continued reference to FIGS. 1-6, FIG. 7 illustrates a flowchart 600 demonstrating a maintenance process for a gas powered turbine incorporating the diffuser assembly of FIG. 2. In order to remove and service a component contained within the diffuser 32, a maintenance worker initially opens the case/housing containing the gas powered turbine 10 at an "Open Case/Housing" step 610.

Once the case or housing is opened, a diffuser case section 130 is removed from the diffuser 32 in a "Remove Diffuser Case Section" step 620. Once the diffuser case section 130 has been removed, the maintenance worker can access the components within the diffuser 32, while the diffuser case diffuser frame 110 provides structural support thereby preventing damage or fatigue to a remainder of the gas powered turbine 10. Once the maintenance worker has access to the component, the worker services the component in a "Service Component" step 630. The service is performed with the gas powered turbine in situ, thereby reducing time, effort, and monetary costs associated with performing the maintenance.

After the servicing has been completed, the maintenance worker replaces the diffuser case section 130 in a "Replace Diffuser Case Section" step 640, and closes the case/housing in a "Close Case/Housing" step 650.

While described above with regards to a land based gas powered turbine, one of skill in the art will understand that the structures and concepts described herein can be applied to aircraft engines, marine engines, or any other gas powered turbine structures with minimal modification.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
    a diffuser connecting a compressor section and a turbine section;
    the diffuser comprising a diffuser frame having a first ring, a second ring, and a plurality of structural ribs connecting said first ring and said second ring, and at least one structural mount structurally connecting the diffuser frame to an engine support, the diffuser further comprising a plurality of diffuser case sections connected to, and protruding radially outward from, said plurality of structural ribs;
    at least one combustor case extending radially outward from at least one of said plurality of diffuser case sections; and
    wherein each of said plurality of structural ribs comprises at least one flange portion, and wherein said at least one flange portion is radially thinner than a remainder of said each of the plurality of structural ribs and extends a full axial length of said each of the plurality of structural ribs, relative to an axis defined by the gas turbine engine, and each of said plurality of diffuser case sections is connected to the at least one flange portion along at least a portion of the full axial length of a corresponding structural rib of said plurality of structural ribs.

2. The turbine engine of claim 1, wherein said first ring is connected to a compressor section and said second ring is connected to a turbine section.

3. The turbine engine of claim 1, wherein each of said plurality of structural ribs includes at least one fastening feature configured to interface with one of said plurality of diffuser case sections.

4. The turbine engine of claim 1, wherein said first ring comprises a flanged portion radially thinner than a remainder of said first ring and said second ring comprises a flanged portion radially thinner than a remainder of said second ring.

5. The turbine engine of claim 1, wherein each of said plurality of structural ribs includes a radially outward bow relative to a centerline of the turbine engine.

6. The turbine engine of claim 5, wherein each of said plurality of structural ribs further comprises a gusset extending radially inward from the radially outward bow.

7. The turbine engine of claim 1, further comprising an external combustor disposed at least partially within said combustor case.

8. The turbine engine of claim 7, wherein the external combustor is disposed partially within said combustor case and partially within a corresponding diffuser case section.

9. The turbine engine of claim 1, wherein the diffuser comprises an internal cavity defined by the diffuser frame and the plurality of diffuser case sections.

10. The turbine engine of claim 1, wherein at least one of said plurality of diffuser case sections includes an unbroken contour at an exterior surface.

11. The turbine engine of claim 1, wherein the diffuser frame is a structural support configured to at least partially support said turbine engine while at least one of said plurality of diffuser case sections is removed.

12. The turbine engine of claim 11, wherein the diffuser frame is a structural support configured to provide full structural support to a combustor portion of the turbine engine while at least one of said plurality of diffuser case sections is removed.

13. The turbine engine of claim 1, wherein said first corresponding structural rib and said second corresponding structural rib are circumferentially adjacent.

14. A method for maintaining a turbine engine comprising:
removing a diffuser case section while said turbine engine is in situ, by disconnecting at least a portion of the diffuser case section from at least one flange portion of a structural rib, the flange portion extending a full axial length of the structural rib, the diffuser case section being connected to the at least one flange portion along at least a portion of the full axial length of the structural rib;
accessing a component;
servicing said component; and
replacing said diffuser case section.

15. The method of claim 14, further comprising providing structural support to the turbine engine using a diffuser case frame.

16. A land based turbine engine comprising:
a compressor section;
a combustor section fluidly connected to the compressor section;
a turbine section fluidly connected to the combustor section;
a diffuser disposed in said combustor section,
the diffuser comprising a diffuser frame having a first ring, a second ring, and a plurality of structural ribs connecting said first ring and said second ring, and at least one structural mount structurally connecting the diffuser frame to an engine support, the diffuser further comprising a plurality of diffuser case sections connected to, and protruding radially outward from, said plurality of structural ribs;
at least one combustor case extending radially outward from at least one diffuser case section of the plurality of diffuser case sections; and
wherein each of said plurality of structural ribs comprises at least one flange portion, and wherein said at least one flange portion is radially thinner than a remainder of said each of the plurality of structural ribs and extends a full axial length of said each of the plurality of structural ribs, relative to an axis defined by the gas turbine engine, and each of said plurality of diffuser case sections is connected to the at least one flange portion along at least a portion of the full axial length of a corresponding structural rib of said plurality of structural ribs.

* * * * *

UNITED STATES PATENT AND TRADEMARK OFFICE
CERTIFICATE OF CORRECTION

Page 1 of 1

PATENT NO. : 10,473,117 B2
APPLICATION NO. : 14/805536
DATED : November 12, 2019
INVENTOR(S) : Albert Veninger and Conway Chuong It is certified that error appears in the above-identified patent and that said Letters Patent is hereby corrected as shown below:

In the Claims

In Claim 2, Column 7, Line 8; replace "a compressor section" with --said compressor section--

In Claim 2, Column 7, Line 9; replace "a turbine section" with --said turbine section--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*